United States Patent
Le Buhan et al.

(10) Patent No.: US 8,082,588 B2
(45) Date of Patent: Dec. 20, 2011

(54) SECURED STORAGE METHOD OF ENCRYPTED DATA ON A PERSONAL DIGITAL RECORDER

(75) Inventors: Corine Le Buhan, Les Paccots (CH); Marco Sasselli, Chardonne (CH); Patrick Bertholet, Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1346 days.

(21) Appl. No.: 10/285,592

(22) Filed: Nov. 1, 2002

(65) Prior Publication Data

US 2003/0177365 A1   Sep. 18, 2003

(30) Foreign Application Priority Data

Mar. 15, 2002   (CH) .......................................... 456/02

(51) Int. Cl.
*H04N 21/4408* (2006.01)
(52) U.S. Cl. ........................... 726/26; 380/277; 380/278
(58) Field of Classification Search .................. 380/277, 380/278; 726/26
See application file for complete search history.

(56) References Cited

U.S. PATENT DOCUMENTS

| | | | |
|---|---|---|---|
| 4,613,901 A * | 9/1986 | Gilhousen et al. | 380/239 |
| 4,937,866 A * | 6/1990 | Crowther et al. | 380/241 |
| 5,111,504 A * | 5/1992 | Esserman et al. | 380/281 |
| 5,774,548 A * | 6/1998 | Bando et al. | 380/212 |
| 5,870,474 A * | 2/1999 | Wasilewski et al. | 380/211 |
| 2002/0083438 A1 * | 6/2002 | So et al. | 725/31 |
| 2003/0182579 A1 * | 9/2003 | Leporini et al. | 713/201 |

FOREIGN PATENT DOCUMENTS

| | | |
|---|---|---|
| EP | 0 714 204 A2 | 5/1996 |
| EP | 0 936 774 A1 | 8/1999 |
| FR | 2 732 537 A | 10/1996 |

OTHER PUBLICATIONS

Oliver Kommerling et al., "Design Prinicples for Tamper-Resistant Smartcard Processors", USENIX Workshop on Smartcard Technology, Chicago, IL, USA, May 10-11, 1999, 13 pages.
"Towards a Replacement for the DVB Common Scrambling Algorithm", Farncombe Consulting Group, Oct. 2009, 19 pages.
EBU Project Group B/CA, "Functional Model of a Conditional Access System", EBU Technical Review, Winter 1995, pp. 64-77.
"Smartcard ICs for Pay-TV: Conditional Access and Content Protection", www.st.com/smartcard, Oct. 2005, 2 pages.
"PowerKey Conditional Access System Phase 1.0: System Overview", Scientific-Atlanta, Inc., 7 pages (1997).
H. Cruickshank et al., "A Comparision Between Satellite DVB Conditional Access and Secure IP Multicast", 14th IST Mobile and Wireless Communications Summit, Dresden, Germany, June 2005, 5 pages.

* cited by examiner

*Primary Examiner* — Nasser Moazzami
*Assistant Examiner* — Tamara Teslovich
(74) *Attorney, Agent, or Firm* — DLA Piper LLP US

(57) ABSTRACT

The objective of the present invention is a storage method in a decoder of an event encrypted by control words that guarantees the access to this event at whichever moment, even if certain keys of the system have changed for security reasons. This objective is achieved by a storage method of an event encrypted by control words in a reception and decryption unit connected to a security unit, said control words and the necessary rights being contained in management messages encrypted by system keys, comprising storing the encrypted event as well as the control messages in the storage unit, and storing in the storage unit the system keys encrypted by a predefined local key stored in the security unit.

23 Claims, 1 Drawing Sheet

SECURED STORAGE METHOD OF ENCRYPTED DATA ON A PERSONAL DIGITAL RECORDER

The present application concerns the field of receivers/decoders of conditional access services, particularly of receivers that have a storage unit such as hard disks.

The technological evolution in the field of storage capacities and the speed of the magnetic disks (hard disks) has made it possible to store the broadcasted video content to make it accessible off-line to a user.

Such receivers are known with the brand ReplayTV® or Tivo® and propose storages of several tens of hours of digital transmission. These receivers are not always directly integrated in the receivers/decoders of conditional access services; particularly, the content is stored without specific protection on the disk, which makes it impossible to collect the authors' royalties associated to the content in the case where the disk would then be duplicated with commercial redistribution purposes.

Inversely, in a digital pay television system the digital flux transmitted to the receivers is encrypted in order to be able to control the use and to define the conditions for such a use. This encryption is carried out thanks to control words that are changed at a regular interval (typically between 5 and 30 seconds) so as to dissuade from any attack trying to recover such a control word.

For the receiver to be able to decrypt the flux encrypted by these control words, the latter are sent to him/her independently of the flux in control messages (ECM) encrypted by a key specific to the transmission system between the operating system (CAS) and the security module of the user unit. In fact, the security operations are performed in a security unit (SC) that is generally in the form of a smart card, reputed inviolable. This unit can either be of a moveable type or directly integrated in the receiver.

During the decryption of a control message (ECM), the presence of the right to access the considered flux is verified in the security unit (SC). This right can be administered by authorization messages (EMM) that load such a right in the security unit (SC). Other possibilities are equally possible, such as the sending of decryption keys.

In the following explanation, we will use the name "event" for a content of video, audio (for example MP3) or data (a game program for example) that is encrypted according to the known method of control words, that is, with a key that is only valid for all or a part of the content.

The accounting of use of such events is based today on the principle of subscription or of unitary purchase. The subscription allows defining the right associated to one or several transmission channels of these events and allows the user to obtain these events in plaintext if the right is present in his/her security unit.

At the same time, it is possible to define rights that are specific to an event, such as a film or a football match. The user can acquire this right (purchase for example) and this event will be specifically administered by this right. This method is known as pay-per-view (PPV).

A control message (ECM) does not only contain the control word, but also the conditions for this control word to be transmitted to the receiver/decoder. During the decryption of the control words, one will verify if a right associated to the conditions of access announced in the message are present in the security unit.

The control word is only returned to the user unit when the comparison is positive. This control word is contained in a control message ECM that is encrypted by a transmission key (TK).

For the right to be present in the security unit, it has to be charged by a right management message (EMM), which for security reasons is generally encrypted by a different key namely the right key (RK).

According to a known form of pay television transmission, the three following elements are necessary to decrypt the content at a given moment:
  the event encrypted by a plurality of control words
  the ECM control messages containing said control words
  the corresponding right stored in the security unit to return these control words to the decoder unit.

In the following explanation, we will use the name "system keys" for the set of the keys and information linked to the decryption keys allowing access to the content. In a known configuration of pay television, they are transmission keys for decrypting the control messages (ECM) and right keys for decrypting the right messages (EMM).

According to a known layout, the encrypted content that is stored in a storage unit such as a hard disk is accompanied at least by control messages ECM.

Due to the fact that the decryption a posteriori of the ECM messages can be a problem, particularly because of the changing of the transmission key, a first solution is proposed in the document EP 0 912 052, which solution implies the decryption of these messages in the security unit and the re-encryption before the storage on the disk by a local key.

This solution solves the problem of the life time of the transmission key, but charges greatly the security unit at the moment of the recording, without knowing if the recorded content will one day be used. Furthermore, one of the fundamental rules of the security system is to return the control words to the user unit only if the rights exist. In this case, it is very probable that these rights do not exist if we consider a purchase per event. The right will be acquired during the purchase that can be done much later, when the user decides to view this event.

This document EP 0 912 052 does not solve the problem of access to the right as at the moment of the purchase the right message EMM has to be always transmitted so that it is charged in the security unit.

In this way, the solution described in this document is only applicable for transmitted events for which the right is already present in the security unit in order to authorize the decryption and the re-encryption of the ECM.

There remains then a non-solved problem when we store events without having the right at the moment of storage or when the conditions of decryption vary between the moment of the storage and the moment of the operation of the event by the user. Another aspect is the supplementary charge required by the security unit for this decryption and re-encryption.

The objective of the present invention is to propose a storage method of an event encrypted by control words (CW) that guarantees the access to this event at whichever moment, even if certain keys of the system have changed for security reasons.

This objective is achieved by a storage method of an event encrypted by control words (CW) in a receiver/decoder unit connected to a security unit (SC), these control words (CW) and the necessary rights being contained in management messages (ECM, EMM) encrypted by system keys (TK, RK), characterized in that it consists in storing the encrypted event and the control messages (ECM) in a storage unit, and in storing in the storage unit the system keys (SK) encrypted by a predefined local key stored in the security unit (SC).

In this way, the storage unit contains all the elements that allow at a given moment to view this event, at the same time guaranteeing the security that was initially defined.

According to the invention, for this operation of storage of the system keys, these keys being necessary for the decryption of the control messages and for their operation, a different key is used different from those used in the normal frame of the reception system. It is called predefined because it can be a group of keys that are used for the month of January and another for the month of February; even one key for even days and another for odd days. This date indication is included in the content and thus the adequate key may be used to decrypt the whole of the encrypted keys SK.

In the known systems of pay television, the management messages are composed of control messages (ECM) and right messages (EMM). The transmission key or keys (TK) that allow decrypting the control messages (ECM) are changed at a regular interval. Furthermore, according to the chosen type of implementation, it is possible to change also the right key or keys (RK) that are in charge of decrypting the right messages (EMM). We must point out here that depending on the chosen implementation it is possible to use more than one key to decrypt a transmission message (ECM) or to decrypt a right message (EMM).

During the encryption of the system keys it is possible to create, not only a block containing the transmission keys and the right keys, but two blocks encrypted by the local key, the first containing the transmission keys, and the second containing the right keys.

In this way, the solution proposed by the present invention is to use a particular key (S1) that will never be changed and thus guarantees that years later it will be possible to access the encrypted event.

In a particular embodiment, a session key AS is generated randomly and this key is used to encrypt the system keys. Beside transferring the encrypted system keys, the security unit encrypt the session key by the local key S1 and transfer it into the storage unit. This embodiment presents the advantage to have different algorithms for the encryption of the system keys and the session key, particularly in term of level of security. The encryption of the system keys will be executed with a symmetric algorithm and the encryption of the session key could be executed by a symmetric or asymmetric algorithms.

According to the invention, due to the fact that the changing of the keys may occur during the transmission of the encrypted content, it is thus proposed to store all the system keys that are active during the transmission of the content, that is, the keys being used and the following keys ready by the order of changing keys. The security unit has permanently the active key and the future key.

For obvious security reasons, the local key used for the encryption of the transmission key must be kept in the security unit of each receiver/decoder, and a particular attention will be paid to the encryption means (algorithm, length of the key) for encrypting the system keys.

BRIEF DESCRIPTION OF THE DRAWINGS

The invention will be better understood thanks to the following detailed description that makes reference to the annexed figures that are given as a non-limiting example, namely.

DETAILED DESCRIPTION

Figure 1:
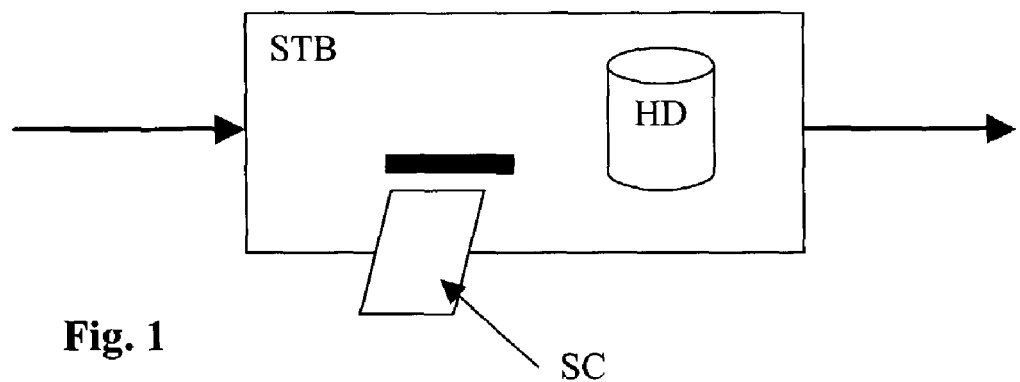
FIG. 1 illustrates a decoder containing a storage unit.
Figure 2:
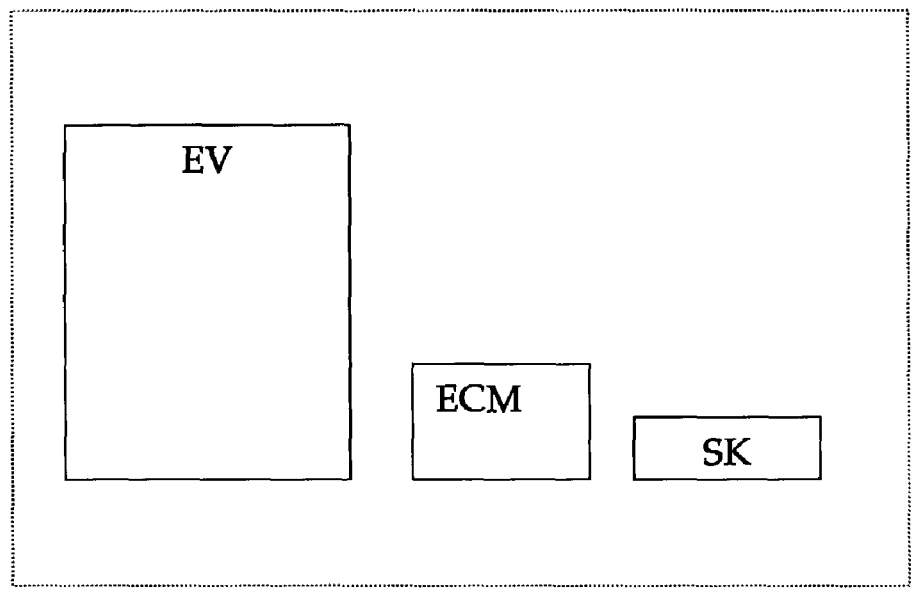
FIG. 2 illustrates the data that are stored in the storing unit.

The decoder (STB) illustrated in FIG. 1 receives input data in encrypted form. These data are stored in the storage unit HD and comprise notably the considered event EV, the control messages ECM, and the right messages EMM.

According to the invention, in such a storage operation, the security unit SC receives the control messages but does not resend them to the user unit. On the contrary, this unit encrypts the system keys with a secret key S1 and this group of encrypted system keys SK is stored in the storage unit.

This secret key S1 can be a key specific to this decoder STB, specific to a group of decoders, or a single key for all the decoders.

During the reading, a particular mechanism is implemented in the security unit. In fact, it is not possible to replace the existing keys with those contained in the group SK. In such a case, the normal functioning of the decoder would be altered.

The keys contained in the group formed by the encrypted system keys SK are stored in a particular region specific to this reading operation of stored information.

The security unit must be capable of unfolding its functions and of using a different memory zone where these past keys will be stored.

Knowing that one or the other of these system keys can change, according to an embodiment of the invention, this group of keys SK is generated at a regular interval and stored in the storage unit HD.

In one embodiment of the invention, particularly when we desire to avoid encrypting the same content (the system keys) with different keys (the secret key S1 of each decoder), or to make accessible the information of the moment of changing of keys, we can add a random part (padding) to the system keys before the encryption. Thanks to this randomness, even during a period where the keys do not change, each encrypted group SK is different.

In another embodiment of the invention, particularly when we desire to hide the periodicity of change of the system keys, an information of validity period, relative to the encryption of time of the content itself (for example from minute 15 to minute 18 of transmission of the content) is added to the recording of each encrypted group SK. The latter is thus valid only for the period of validity that is in this way artificially associated to it, and no longer for the period of validity de facto of the system keys that it hides.

For what concerns the secret key S1, many possibilities are foreseen in the frame of this invention. The common characteristic is that this key is known to the operating center in order to be able to regenerate a security unit SC that would have been lost or destroyed. In fact, from now on, this key becomes the basic element of the access to the stored events and it is imperative that the destruction of a security unit does not make the previously stored data inevitably inaccessible.

In an embodiment with the key S1 specific to a user, this key can be generated during the personalization of the security unit and stored in the operating center regarding the unique number of the unit.

The description of this method is not limited to the field of pay television, but can also be applied to the field of audio storage in MP3 form for example.

Another field of application of the invention concerns the storage of computer programmes or games.

According to another embodiment of the invention, the encrypted content is decrypted thanks to control words that are sent from the security unit to the decoder in encrypted form. This configuration is described in the document WO 99/57901 and guarantees that these control words will not serve for another decoder.

The decryption of these words is carried out directly in the integrated circuit that is in charge of decrypting the content and then re-encrypting it with a key that is also supplied by the security unit. The content is from then on stored in the storage unit of the decoder and is accessible by only one key.

According to this configuration and in this mode of re-encryption, the clear data are not outputted of the specialized integrated circuit.

For security reasons, the key used to re-encrypt the content is called session key, because it is generated in a pseudo-random way each time that such an operation is necessary.

This session key is then encrypted in the same way as the system keys and is stored in the storage unit.

With this key it is possible to add the access conditions to this content, conditions that will be verified during the presentation of this encrypted session key to the security unit.

The invention claimed is:

1. A method for managing access to content comprising:
receiving, in a receiver/decoder unit, encrypted entitlement messages, encrypted content, and at least one system key being usable to access the encrypted entitlement messages, the encrypted content being encrypted by control words, the encrypted entitlement messages including the control words and a necessary right for access to the content, the receiver/decoder unit having a local storage unit and being connected to a security unit, the security unit having a memory separate from the local storage unit and separate from any memory in the receiver/decoder unit;
storing the encrypted content and the encrypted entitlement messages in the storage unit;
encrypting in the security unit the at least one system key with a predefined local key contained in the security unit; and
storing in the storage unit the at least one system key encrypted by the predefined local key, whereby the at least one system key stored in the storage unit may be decrypted to allow decryption of the content even if the at least one system key is no longer stored in the security unit.

2. A method according to claim 1, wherein the at least one system key comprises a key for decrypting the control words.

3. A method according to claim 2, wherein the at least one system key comprises a key for decrypting the entitlement message that include the necessary right for access to the content.

4. A method according to claim 1, wherein the at least one system key comprises a key for decrypting the entitlement message that include the necessary right for access to the content.

5. A method according to claim 1, wherein the local key is duplicated in a management center in order to be able to generate a new security unit in case of need.

6. A method according to claim 2, wherein the local key is duplicated in a management center in order to be able to generate a new security unit in case of need.

7. A method according to claim 3, wherein the local key is duplicated in a management center in order to be able to generate a new security unit in case of need.

8. A method according to claim 4, wherein the local key is duplicated in a management center in order to be able to generate a new security unit in case of need.

9. A method according to claim 2, wherein a transmission key or keys are encrypted by the local key to form a first encrypted system block.

10. A method according to claim 3, wherein a right key or keys are encrypted by the local key to form a second encrypted system block.

11. A method according to claim 4, wherein a right key or keys are encrypted by the local key to form a second encrypted system block.

12. A system for storing broadcast content encrypted by control words, the system comprising:
a storage unit;
a receiver/decoder unit connected to the storage unit, the receiver/decoder unit having a first memory; and
a security unit connected to the receiver/decoder unit, the security unit having a second memory separate from the first memory;
wherein the system is configured to perform the steps of
receiving encrypted entitlement messages containing the control words and the encrypted content;
storing the encrypted content and the encrypted entitlement messages containing the control words in the storage unit, the control words being accessible by using at least one system key;
encrypting the at least one system key by the security unit using a local key stored in the second memory of the security unit;
storing the at least one system key encrypted by the security unit in the storage unit, so that the control words may be retrieved from the storage unit and accessed using the at least one system key stored in the storage unit after a change in the system key in the security unit.

13. The system of claim 12, further comprising the step of storing an entitlement message including a right to access the encrypted content on the storage unit, the entitlement message being encrypted by a system key stored on the storage unit.

14. The system of claim 12, wherein a plurality of system keys are stored in the storage unit.

15. The system of claim 12, wherein the storage unit is a hard drive.

16. The system of claim 12, further comprising the step of decrypting the system key stored in the storage unit after the system key has been deleted from the security module.

17. The method of claim 1, wherein the control words and the necessary right for access to the content are received in separate entitlement messages.

18. The method of claim 17, wherein the control words are received in entitlement control messages and necessary right for access to the content is received in an entitlement management message.

19. The method of claim 1, further comprising the steps of
decrypting in the security unit the at least one system key stored in the storage unit using the predefined local key at a time after a change in the system key in the security unit.

20. A method for managing access to content comprising:
receiving, in a receiver/decoder unit, encrypted entitlement messages, encrypted content, and at least one system key being usable to access the encrypted entitlement messages, the encrypted content being encrypted by control words, the encrypted entitlement messages including the control words and a necessary right for access to the content, the receiver/decoder unit including and being connected to a local storage unit and a security unit, the security unit having a memory separate from the local storage unit and separate from a first memory in the receiver/decoder unit;

storing the encrypted content and the encrypted entitlement messages in the storage unit such that the content for an entire event is present in the storage unit at one time;

encrypting at the receiver/decoder unit the at least one system key under a predefined local key contained in the security unit; and storing in the storage unit the at least one system key encrypted by the predefined local key, whereby the at least one system key stored in the storage unit may be decrypted to allow decryption of the content even if the at least one system key is no longer stored in the security unit.

21. The method of claim 1, wherein an entire event is retained in the storage unit at one time.

22. The method of claim 12, wherein an entire event is retained in the storage unit at one time.

23. A system for storing broadcast content encrypted by control words, the system comprising:

a storage unit;

a receiver/decoder unit connected to the storage unit, the receiver/decoder unit having a first memory; and a security unit connected to the receiver/decoder unit, the security unit having a second memory separate from the first memory;

wherein the system is configured to perform the steps of receiving encrypted entitlement messages containing the control words and the encrypted content;

storing the encrypted content in the storage unit such that, the entirety of the encrypted content for an event is maintained in the storage unit at the same time;

storing the encrypted entitlement messages containing the control words in the storage unit, the control words being accessible by using at, least one system key;

encrypting the at least one system key using a special key stored in the second memory of the security unit, the special key being different from the key used for the encryption of the encrypted entitlement messages received in the receiving step;

storing the at least one system key encrypted by the security unit in the storage unit, so that the control words may be retrieved from the storage unit and accessed using the system key stored in the storage unit after a change in the system key in the security unit.

* * * * *